The specification of this patent is not in print.
7017X
G. DAYTON & A. MALLORY.
WHIP ENGINE FOR TURNING WHIP STOCKS.
Patented Apr. 27, 1832
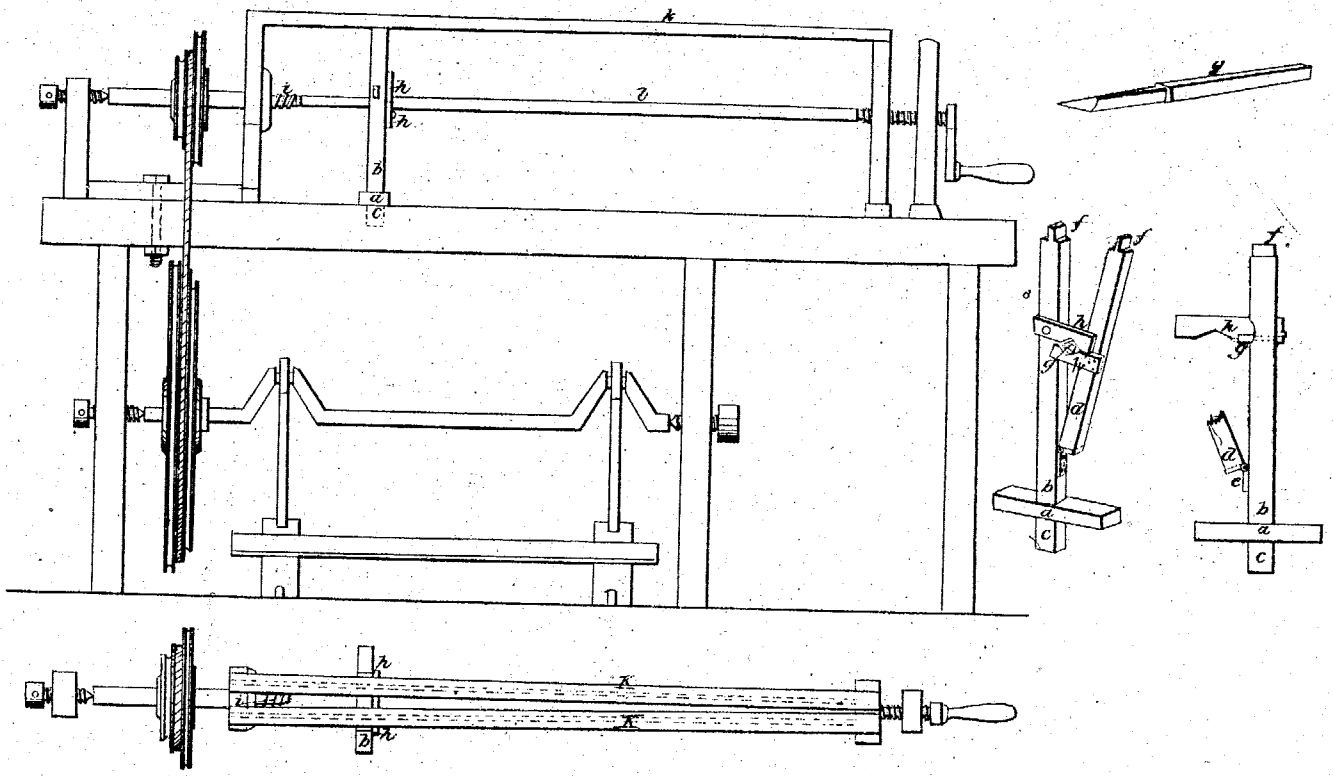

7017x Apr 27, 1832

Giles Dayton & Andrew Mallory, Citizens of the United State
Letters Patent
Dated April 27th 1832.

The Schedule referred to in these Letters Patent, and making part of the same,
containing a description in the words of the said Giles Dayton & Andrew Mallory them
selves, of their improvement in the Whip Engine for Turning Whip Stocks.

---

(The Whip Engine is made of wood, and plated with iron, or any other metal, in the
places exposed to friction. or may be made all of metal; and is constructed in the follo
ing manner, viz.

First say, a stick or piece of timber 2½ inches square, and 2 feet in length, called the
Jack; at one end of which is attached a smaller piece, called the slide, of about 1½ foo
long, 3 inches wide and 1 inch thick, placed transversely, and fastened by bolts or tenu
so as to form a Te and is called by that name. The slide which forms the Te must project
about 1 inch from the lower edge of the Jack piece, that it may fall into a groove prepared
it, and in which moves back and forth to any distance required while in operation.
on the under side of the Jack in a lateral direction, is a piece of timber of the same siz
but 4 or 5 inches shorter at the end next to the slide: this piece is called the Cat, and
fastened to the Jack by means of a hinge or bolt, so that the other ends (being of equa
length) may open and shut like tongs. These ends are reduced at the extremities, in a
izontal direction, to the thickness of about ½ an inch, in form of tenons; these tenons
and move in grooves prepared for them, and which are so graduated, as to cause
opening and shutting.

Within 5 or 6 inches of the opening end of the Jack, is placed the cutting iron
is shaped so as to answer the double purpose of gouge and chisel. The edge of cutti
describes about the 4th part of a circle of 2½ inches diameter. From one end of the cu
iron, is turned a shank, about 3 inches in length and of sufficient strength to sup
it against the force required to perform its work.

At the place where the cutting iron is placed in the Jack, the timber is rounded
till it corresponds with the circle of the edge, and an opening or mouth is made m
to discharge the chips or shavings. The use of the Cat piece is to confine the rod, (wh
whatever is turned) to its proper position against the edge of the cutting iron; and in a Drawing made from [illegible]

and for the same purpose, is attached (on the backside, opposite where the Cutter begins its work) are two pieces or blocks of about five inches in length, and two in breadth and one in thickness, mitred at one end of each piece; one of these pieces is fastened on the Cat stationary. The other so placed on the Jack, as that the mitres shall come together, and fastened only by a pivot at one end, so that it may move, or graduate on the mitre, as the tongs open and shut. The use of these mitred pieces is to form a support to the whip, (rod, or whatever) and keep it from receding in a horizontal direction from the cutting iron, any faster than the whip or rod, is intended to increase in size.

The shape of whatever is turned depends on the distance of the grooves in which the two [illegible] move and by which they are governed.

N.B. Any Engine of the above dimensions, will turn a rod or whip to any size required, say from ¼ of an inch to 2 inches diameter, either of equal size, or tapering or of unequal swells, &c.

This engine is readily attached to any common turning lathe, and made of the mandrel, or chock to give motion to the whip, rod, &c; while the other end is placed in the engine, which moves up (directed by the grooves) till it approaches the mandrel, the whip is then taken out, and the engine thrown back for another to be placed. The grooves being moveable are readily adapted to the turning of Broom handles, Hoe handles, Curtain rods, Rake stales, Umbrella staves, Chair rods, Walking canes, &c. and may be extended to almost any size.

General observations. The above described Engine or Machine for turning whips, or any thing that is long and limber; we claim to be an invention, or discovery, of our own, and not an improvement on any thing ever used for that purpose.

Witnesses
Augustus Collins
Enos Mood

Giles Dayton
Andrew Mallory (829 words)

Received & Recorded June 19th 1841. and Examined M.J.C.